United States Patent
Fukami et al.

(10) Patent No.: US 10,760,546 B2
(45) Date of Patent: Sep. 1, 2020

(54) MOUNTING METHOD AND TEMPLATE FOR VORTEX GENERATOR

(71) Applicant: MITSUBISHI HEAVY INDUSTRIES, LTD., Tokyo (JP)

(72) Inventors: Koji Fukami, Tokyo (JP); Daisuke Wakata, Tokyo (JP); Yuji Yatomi, Tokyo (JP); Takashi Yamamura, Kanagawa (JP); Yoshihiro Fujioka, Kanagawa (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 182 days.

(21) Appl. No.: 15/335,644

(22) Filed: Oct. 27, 2016

(65) Prior Publication Data
US 2017/0248117 A1    Aug. 31, 2017

(30) Foreign Application Priority Data

Feb. 26, 2016   (JP) .................................. 2016-035880

(51) Int. Cl.
F03D 1/06  (2006.01)
F03D 13/10  (2016.01)

(52) U.S. Cl.
CPC ......... *F03D 1/0683* (2013.01); *F03D 1/0633* (2013.01); *F03D 1/0675* (2013.01);
(Continued)

(58) Field of Classification Search
CPC ...... F03D 1/001; F03D 1/0633; F03D 1/0683; F03D 1/0675; F05B 2240/122; F05B 2250/141; F05B 2240/30
See application file for complete search history.

(56) References Cited

U.S. PATENT DOCUMENTS 2,690,315 A   9/1954  Todoroff
4,175,640 A   11/1979  Birch et al.
(Continued)

FOREIGN PATENT DOCUMENTS

AU   2006344292 A1   12/2007
DE   102013201871 A1   8/2014
(Continued)

OTHER PUBLICATIONS

RVProject, YouTube, https://www.youtube.com/watch?v=sxz85_uyWUc, Published Jul. 5, 2015 (Year: 2015).*
(Continued)

*Primary Examiner* — Christopher M Koehler
*Assistant Examiner* — Kyle A Cook
(74) *Attorney, Agent, or Firm* — Kanesaka Berner and Partners LLP

(57) ABSTRACT

A method of mounting a vortex generator to a wind turbine blade includes: a step of specifying positions of at least two reference points at different coordinates in a blade spanwise direction of the wind turbine blade on the wind turbine blade; and a step of adjusting a mounting direction of the vortex generator and mounting the vortex generator to the wind turbine blade, with reference to a line connecting the reference points. The step of specifying the positions of the reference points comprises specifying the position of each of the reference points on the basis of: a length along a surface of the wind turbine blade in a chordwise direction from a trailing edge of the wind turbine blade or from a blade spanwise directional line extending along the blade spanwise direction on the surface of the wind turbine blade; and a distance in the blade spanwise direction from a blade root or from a blade tip of the wind turbine blade.

15 Claims, 15 Drawing Sheets

(52) U.S. Cl.
CPC ........ *F03D 13/10* (2016.05); *F05B 2230/604* (2013.01); *F05B 2240/122* (2013.01); *F05B 2240/30* (2013.01); *F05B 2250/141* (2013.01); *Y02E 10/721* (2013.01); *Y02P 70/523* (2015.11)

(56) References Cited

U.S. PATENT DOCUMENTS

| | | | |
|---|---|---|---|
| 5,117,560 A | 6/1992 | Nevins | |
| 5,474,425 A * | 12/1995 | Lawlor | F03D 1/065 416/223 R |
| 6,427,948 B1 | 8/2002 | Campbell | |
| 2010/0170339 A1 * | 7/2010 | Lenz | G01M 1/12 73/455 |
| 2010/0209258 A1 | 8/2010 | Fuglsang et al. | |
| 2011/0142673 A1 * | 6/2011 | Fang | F03D 1/0633 416/241 R |
| 2012/0151769 A1 | 6/2012 | Brake et al. | |
| 2012/0257979 A1 * | 10/2012 | Jensen | F03D 1/0608 416/223 R |
| 2013/0129520 A1 | 5/2013 | Enevoldsen et al. | |
| 2014/0140856 A1 | 5/2014 | Madsen et al. | |
| 2014/0328692 A1 | 11/2014 | Riddell et al. | |
| 2015/0010407 A1 | 1/2015 | Zamora Rodriguez et al. | |
| 2015/0132135 A1 * | 5/2015 | Booth | F01D 5/30 416/204 R |
| 2016/0017864 A1 * | 1/2016 | Grabau | F03D 1/0633 416/235 |

FOREIGN PATENT DOCUMENTS

| | | | | |
|---|---|---|---|---|
| DK | 2548801 A1 * | 1/2013 | ........... | F03D 1/0675 |
| EP | 2031241 A1 | 3/2009 | | |
| EP | 2484895 A1 | 8/2012 | | |
| EP | 2484896 A1 | 8/2012 | | |
| EP | 2484897 A1 | 8/2012 | | |
| EP | 2484898 A1 | 8/2012 | | |
| EP | 2548800 A1 | 1/2013 | | |
| EP | 2597300 A1 | 5/2013 | | |
| EP | 2799709 A1 | 11/2014 | | |
| EP | 2799710 A1 | 11/2014 | | |
| EP | 2801720 A1 | 11/2014 | | |
| EP | 2975259 A1 | 1/2016 | | |
| WO | 00/15961 A1 | 3/2000 | | |
| WO | 2007/140771 A1 | 12/2007 | | |
| WO | 2013/014082 A2 | 1/2013 | | |
| WO | 2015/030573 A1 | 3/2015 | | |
| WO | 2015/053768 A1 | 4/2015 | | |

OTHER PUBLICATIONS

Adventures on the Fly!, YouTube, https://www.youtube.com/watch?v=JV80QAzSaiR4, Published Feb. 27, 2014 (Year: 2014).*
Office Action in JP Application No. 2016-035880, dated Feb. 7, 2017.
Office Action in EP Application No. 16189461.3, dated May 24, 2018. 5pp.
Extended European Search Report in EP Application No. 16189461.3, dated Jun. 30, 2017. 9pp.
Extended European Search Report in EP Application No. 16189464.7, dated Jul. 4, 2017. 7pp.
Extended European Search Report in EP Application No. 17200830.2, dated Mar. 15, 2018. 7pp.
Partial refusal notification issued by the JPO to the relevant Design Application No. 2016-500691, dated Oct. 7, 2016, which was derived from an International Registration No. DM/090957.
Partial refusal notification issued by the JPO to the relevant Design Application No. 2016-500692, dated Oct. 7, 2016, which was derived from an International Design Registration No. DM/090957.
Office Action for U.S. Appl. No. 15/259,811 dated Jun. 12, 2018; 15pp.
Office Action for European Application No. 16189461.3 dated Feb. 15, 2019; 5pp.
Office Action for U.S. Appl. No. 15/259,811 dated Mar. 22, 2019; 14pp.
Office Action for U.S. Appl. No. 15/259,811 dated Sep. 20, 2019.
Office Action for U.S. Appl. No. 15/259,811 dated Dec. 30, 2019; 37pp.

* cited by examiner

MOUNTING METHOD AND TEMPLATE FOR VORTEX GENERATOR

RELATED APPLICATIONS

The present application claims priority to Japanese Patent Application Number 2016-035880, filed Feb. 26, 2016, the disclosure of which is hereby incorporated by reference herein in its entirety.

TECHNICAL FIELD

The present disclosure relates to a method of mounting a vortex generator, and a template for mounting a vortex generator to a wind turbine blade.

BACKGROUND ART

Approaches to improve aerodynamic performance of a wind turbine blade have been sought for some time in context of improvement of operation efficiency of a wind turbine. In one of the approaches, a vortex generator is disposed on a surface of a wind turbine blade to suppress separation of a flow along the surface of the wind turbine blade.

Patent Documents 1 to 10 disclose a vortex generator having a platform portion to be mounted to a surface of a wind turbine blade, and a fin disposed upright on the platform portion.

CITATION LIST

Patent Literature

Patent Document 1: US2014/0140856A
Patent Document 2: EP2548800A
Patent Document 3: EP2799709A
Patent Document 4: WO2007/140771A
Patent Document 5: EP2484895A
Patent Document 6: EP2484896A
Patent Document 7: EP2484897A
Patent Document 8: EP2484898A
Patent Document 9: WO2015/030573A
Patent Document 10: EP2597300A

SUMMARY

If a mounting direction of a vortex generator with respect to an inflow direction of wind is not a suitable direction, generation of vortices by the vortex generator may become unstable, which may lead to insufficient improvement of the aerodynamic performance of a wind turbine blade, or even to a decrease in the aerodynamic performance of a wind turbine blade. Thus, it is desirable to mount a vortex generator to a wind turbine blade so that the vortex generator forms a predetermined mounting angle with the wind turbine blade.

However, Patent Documents 1 to 10 do not disclose any specific method for mounting a vortex generator to a wind turbine blade with accuracy at a predetermined mounting angle.

In view of the above, an object of at least one embodiment of the present invention is to provide a method of mounting a vortex generator to a wind turbine blade in a suitable mounting direction with respect to an inflow direction of wind.

(1) A method of mounting a vortex generator to a wind turbine blade, according to at least one embodiment of the present invention, comprises: a step of specifying positions of at least two reference points at different coordinates in a blade spanwise direction of the wind turbine blade on the wind turbine blade; and a step of adjusting a mounting direction of the vortex generator and mounting the vortex generator to the wind turbine blade, with reference to a line connecting the reference points. The step of specifying the positions of the reference points comprises specifying the position of each of the reference points on the basis of: a length along a surface of the wind turbine blade in a chordwise direction from a trailing edge of the wind turbine blade or from a blade spanwise directional line extending along the blade spanwise direction on the surface of the wind turbine blade; and a distance in the blade spanwise direction from a blade root or from a blade tip of the wind turbine blade.

According the above method (1), the positions of the reference points are specified on the wind turbine blade on the basis of: the length along the surface of the wind turbine blade in the chordwise direction from the trailing edge of the wind turbine blade or the blade spanwise directional line; and the distance in the blade spanwise direction from the blade root or the blade tip of the wind turbine blade, and thereby the positions of the reference points can be specified reliably on the wind turbine blade. Furthermore, according to the above method (1), at least two points at different coordinates in the blade spanwise direction of the wind turbine blade are used as the reference points for determining the line, which indicates a direction that serves as a reference in mounting the vortex generator (hereinafter, also referred to as a reference direction). Thus, a longer distance can be ensured between the two points than in a case where two or more points at different coordinates in the chordwise direction of the wind turbine blade are used as reference points, and thus misalignment of reference points specified on the wind turbine blade results in a smaller error in the direction of the line connecting the reference points (reference direction). Thus, according to the above method (1), it is possible to specify the line indicating the reference direction for mounting vortex generators on the surface of the wind turbine blade with high accuracy, and thereby it is possible to mount vortex generators to the wind turbine blade in a suitable mounting direction with respect to an inflow direction of wind.

(2) In some embodiments, the above method (1) comprises aligning a plurality of the vortex generators linearly along the line, adjusting the mounting direction of each of the vortex generators with reference to the line, and mounting the plurality of vortex generators to the wind turbine blade.

According to the above method (2), the vortex generators are aligned linearly along a single line indicating the reference direction, and the mounting direction of each vortex generator is adjusted with reference to the line, and thereby it is possible to mount each of the vortex generators to the wind turbine blade in a suitable mounting direction with respect to an inflow direction of wind.

(3) In some embodiments, in the above method (2), the at least two reference points include mounting coordinates of the plurality of vortex generators to be aligned linearly.

According to the above method (3), the reference points for defining the line that indicates the reference direction include mounting coordinates of the plurality of vortex generators aligned linearly, which makes it possible to specify the positions of the reference points and the mounting positions of the vortex generators simultaneously on the wind turbine blade, and thereby it is possible to mount the vortex generators to the wind turbine blade efficiently.

(4) In some embodiments, the method according to any one of the above (1) to (3) further comprises a step of determining a mounting position of the vortex generator on the basis of a fluid-analysis result on the wind turbine blade.

According to the above method (4), it is possible to determine the mounting positions of the vortex generators suitably so as to improve aerodynamic performance of the wind turbine blade on the basis of a fluid analysis result on the wind turbine blade.

(5) In some embodiments, in the above method (4), the step of determining a mounting position of the vortex generator comprises determining mounting positions of a plurality of the vortex generators by approximating ideal mounting positions of the plurality of vortex generators indicated by the fluid-analysis result with at least one line.

According to the above method (5), the ideal mounting positions of the vortex generators indicated by a fluid analysis result are approximated with a line, and thereby it is possible to mount the vortex generators to suitably-determined mounting positions efficiently, with reference to the approximate line.

(6) In some embodiments, in the method according to any one of the above (1) to (5), the vortex generator includes a mark indicating orientation of the vortex generator, and the mounting direction of the vortex generator is adjusted with reference to the line by aligning the mark along the line.

According to the above method (6), the vortex generator has a mark indicating orientation, and the mounting direction of the vortex generator is adjusted so that the mark is along the line indicating the reference direction and forms a predetermined angle, and thereby it is possible to mount the vortex generator to the wind turbine blade in a suitable mounting direction with respect to an inflow direction of wind accurately.

(7) In some embodiments, the method according to any one of the above (1) to (6) further comprises a step of placing a template on the wind turbine blade with reference to the line, the template having at least one opening having a shape corresponding to an outline of a platform portion of the vortex generator. The step of mounting the vortex generator comprises fitting the platform portion of the vortex generator into the opening of the template placed on the wind turbine blade and mounting the vortex generator to the wind turbine blade.

According to the above method (7), the template is placed on the wind turbine blade with reference to the line indicating the reference direction, the platform portion of the vortex generator is fitted into the opening of the template, and the vortex generator is mounted to the wind turbine blade, which makes it possible to position and mount the vortex generator to the wind turbine blade readily.

(8) In some embodiments, in the above method (7), a mark indicating orientation of the vortex generator including the platform portion to be fitted into the opening is formed on the template, and the step of mounting the vortex generator comprises adjusting the mounting direction of the vortex generator with reference to the mark of the template, while the platform portion of the vortex generator is fitted in the opening.

According to the above method (8), the mounting direction of the vortex generator is adjusted with reference to the mark of the template while the platform portion of the vortex generator is fitted in the opening of the template, and thereby it is possible to adjust the mounting direction of the vortex generator readily.

(9) In some embodiments, in the above method (8), the platform portion of the vortex generator has a circular shape in a top view, and the method comprises adjusting the mounting direction of the vortex generator by revolving the vortex generator while the platform portion of the vortex generator is fitted in the opening.

According to the above method (9), the vortex generator is revolved while the platform portion having a circular shape in a top view is fitted in the template, and thereby it is possible to adjust the mounting direction of the vortex generator readily.

(10) In some embodiments, in the above method (8), the template includes a template body, and a rotary part having the opening and mounted rotatably to the template body, and the method comprises adjusting the mounting direction of the vortex generator by revolving the vortex generator together with the rotary part while the platform portion of the vortex generator is fitted in the opening.

According to the above method (10), the vortex generator is revolved together with the rotary part while the platform portion of the vortex generator is fitted in the opening of the template, and thereby it is possible to adjust the mounting direction of the vortex generator readily also for a vortex generator having a platform portion of a non-circular shape.

(11) In some embodiments, in the method according to any one of the above (7) to (10), the template has a plurality of the openings aligned along a longitudinal direction of the template, and the platform portions of the plurality of vortex generators are fitted into the respective openings of the template to align the plurality of vortex generators linearly along the line.

According to the above method (11), the platform portions of the plurality of vortex generators are fitted into the respective openings aligned along the longitudinal direction of the template, and thereby the plurality of vortex generators is aligned linearly along the line indicating the reference direction. Accordingly, positioning and mounting can be performed at the same time for the plurality of vortex generators, and thus it is possible to mount the vortex generators to the wind turbine blade efficiently.

(12) In some embodiments, in the method according to any one of the above (1) to (11), the step of specifying the positions of the reference points comprises measuring a distance in the blade spanwise direction from the blade root or from the blade tip of the wind turbine blade with a laser meter.

According to the above method (12), a laser meter is used to measure a distance in the blade spanwise direction from the blade root or the blade tip of the wind turbine blade, and thereby it is possible to specify the positions of the reference points appropriately.

(13) In some embodiments, the method according to any one of the above (1) to (12) further comprises a step of visually displaying the line connecting the reference points on the surface of the wind turbine blade. The mounting step comprises adjusting the mounting direction of the vortex generator with reference to the line displayed on the surface of the wind turbine blade and mounting the vortex generator to the wind turbine blade.

According to the above method (13), the line indicating the reference direction is visually displayed on the surface of the wind turbine blade, and thereby it is possible to mount each of the vortex generators to the wind turbine blade in a suitable mounting direction with respect to an inflow direction of wind readily with reference to the line displayed on the surface of the wind turbine blade.

(14) A template according to at least one embodiment of the present invention is the template used in the method according to any one of the above (7) to (11), and comprises at least one opening having a shape corresponding to an outline of the platform portion of the vortex generator.

With the above configuration (14), the template is placed on the wind turbine blade with reference to the line indicating the reference direction, the platform portion of the vortex generator is fitted into the opening of the template, and the vortex generator is mounted to the wind turbine blade, which makes it possible to position and mount the vortex generator to the wind turbine blade readily.

(15) A template according to at least one embodiment of the present invention is for mounting a vortex generator to a wind turbine blade, and comprises at least one opening having a shape corresponding to an outline of a platform portion of the vortex generator. The template is configured to support the vortex generator revolvably while the platform portion of the vortex generator is fitted in the opening.

With the above configuration (15), the vortex generators are revolved while the platform portions are fitted in the template, and thereby it is possible to adjust the mounting direction of the vortex generators readily and to mount the vortex generators efficiently to the wind turbine blade.

According to at least one embodiment of the present invention, provided is a method of mounting a vortex generator to a wind turbine blade in a suitable mounting direction with respect to an inflow direction of wind.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention.

Figure 1:
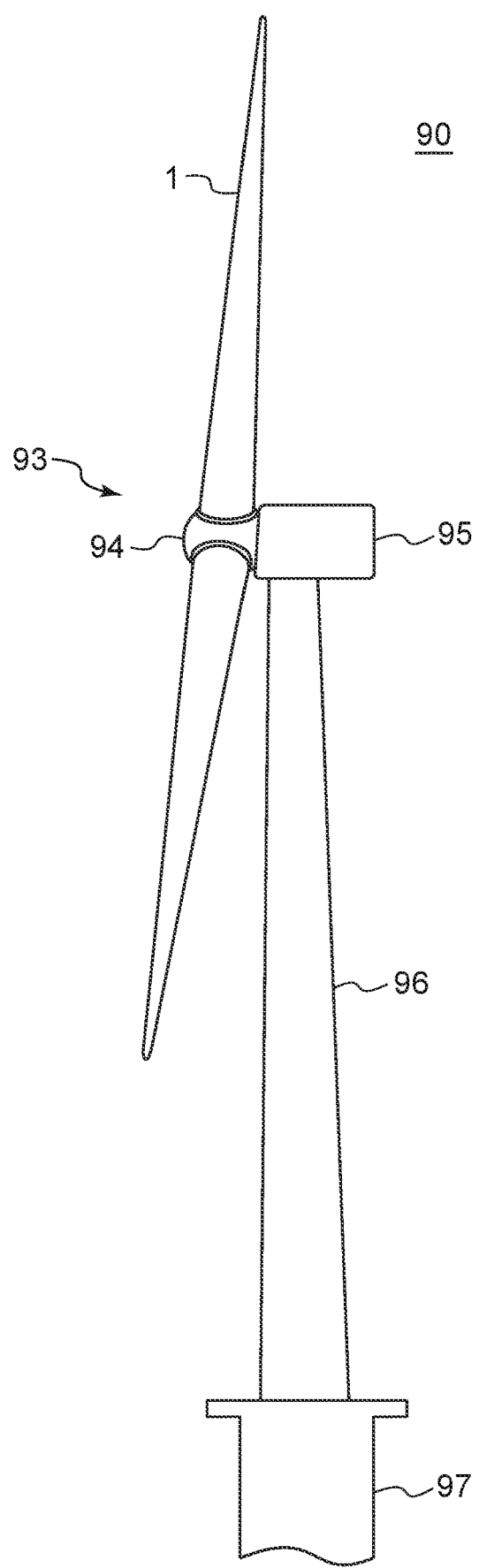
FIG. 1 is a schematic configuration diagram of a wind turbine power generating apparatus including a wind turbine blade to which a method of mounting a vortex generator according to an embodiment is to be applied.
Figure 2:
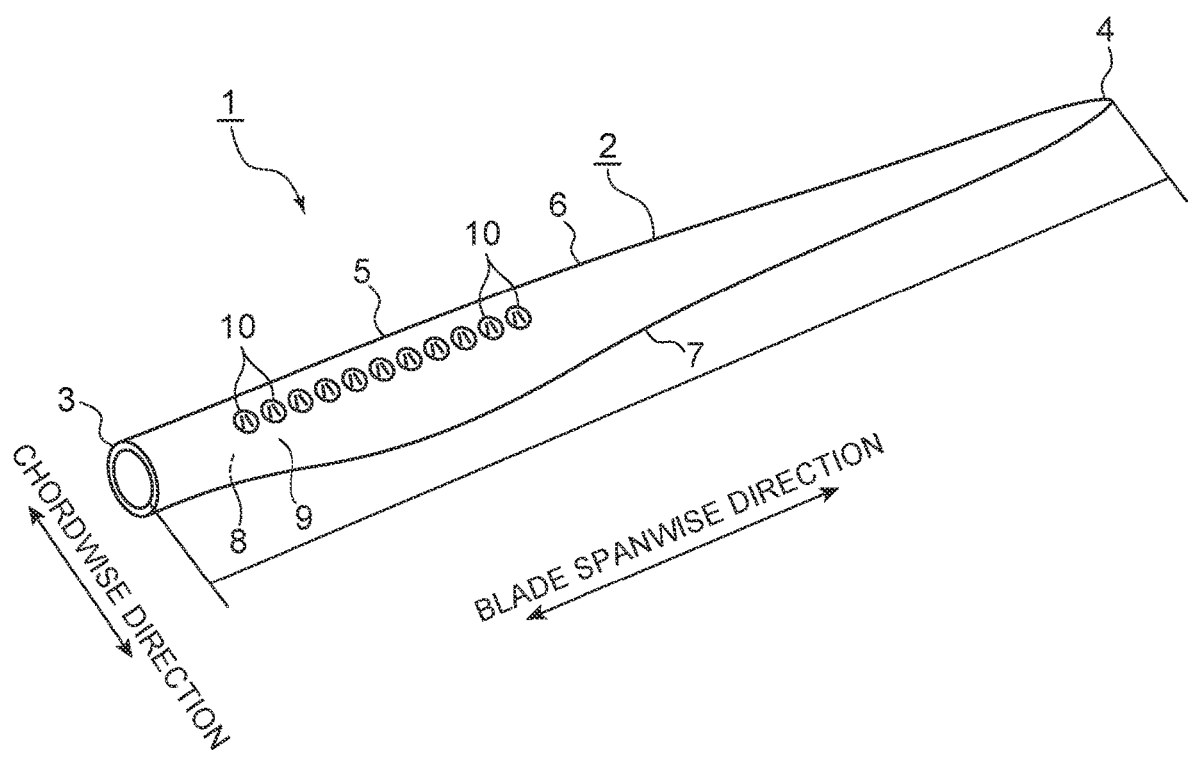
FIG. 2 is a perspective view of a wind turbine blade to which a method of mounting a vortex generator according to an embodiment is to be applied.

With reference to FIGS. 1 and 2, a wind turbine blade to which a method of mounting a vortex generator according to some embodiments will now be described. FIG. 1 is a schematic configuration diagram of a wind turbine power generating apparatus including a wind turbine blade to which a method of mounting a vortex generator according to an embodiment is to be applied. FIG. 2 is a perspective view of a wind turbine blade to which a method of mounting a vortex generator according to an embodiment is to be applied.

As depicted in FIG. 1, a wind turbine power generating apparatus 90 includes a rotor 93 including at least one (e.g. three) wind turbine blades 1 and a hub 94. The wind turbine blades 1 are mounted to the hub 94 in a radial fashion, the rotor 93 rotates in response to wind received by the wind turbine blades 1, and a generator (not depicted) coupled to the rotor 93 generates electric power.

In the embodiment depicted in FIG. 1, the rotor 93 is supported by a nacelle 95 disposed on an upper part of a tower 96. The tower 96 is disposed to stand upright on a base structure 97 (e.g. foundation structure or floating structure) disposed offshore or onshore.

As described below, a vortex generator is to be mounted to the wind turbine blade 1 of the wind turbine power generating apparatus 90 by a mounting method according to an embodiment.

As depicted in FIG. 2, the wind turbine blade 1 includes a blade body 2. Vortex generators 10 are mounted to the surface (blade surface) of the blade body 2 by a mounting method according to an embodiment. In FIG. 2, the vortex generators 10 are already mounted to the wind turbine blade 1.

The blade body 2 includes a blade root 3 to be attached to the hub 94 of the wind turbine power generating apparatus 90, a blade tip 4 positioned farthest from the hub 94, and an airfoil part 5 extending between the blade root 3 and the blade tip 4. The wind turbine blade 1 has a leading edge 6 and a trailing edge 7 from the blade root 3 to the blade tip 4. Further, an exterior shape of the wind turbine blade 1 is formed by a pressure surface 8 and a suction surface 9 disposed opposite to the pressure surface 8.

With regard to the wind turbine blade 1 depicted in FIG. 2, a plurality of the vortex generators 10 is mounted to the suction surface 9 of the blade body 2. Furthermore, the plurality of vortex generators 10 is mounted to the suction surface 9 of the blade body 2 in a blade spanwise direction.

In the present specification, "blade spanwise direction" refers to a direction connecting the blade root 3 and the blade tip 4, and "blade chordwise direction" refers to a direction along a line (chord) connecting the leading edge 6 and the trailing edge 7 of the blade body 2.

Next, the vortex generator 10 to be mounted to the wind turbine blade 1 by a mounting method according to some embodiments will be described in detail with reference to FIGS. 3A to 4B.

Figure 3A:
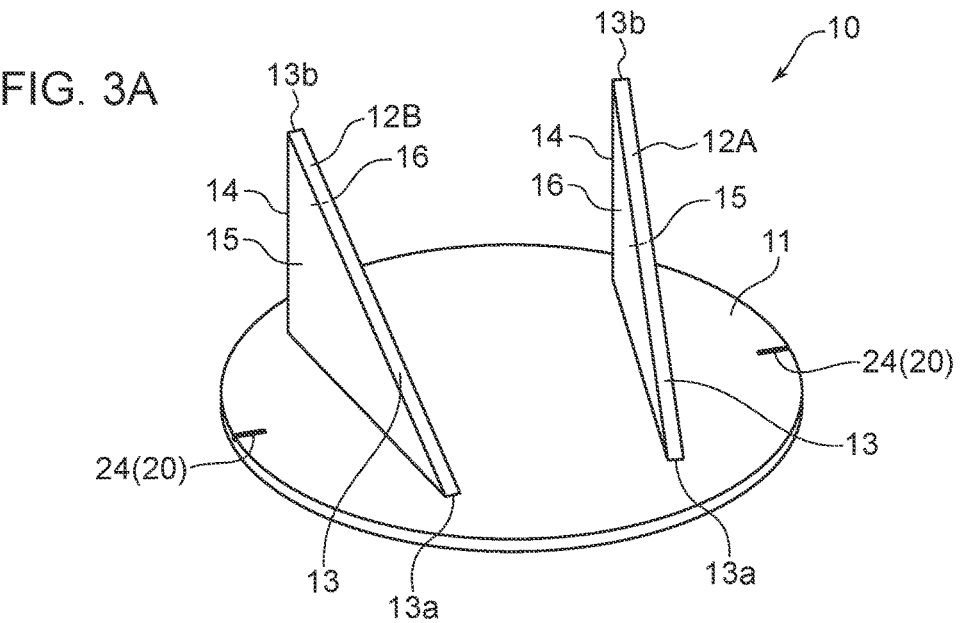
FIG. 3A is a perspective view of a vortex generator to which a mounting method according to an embodiment is to be applied.
Figure 3B:
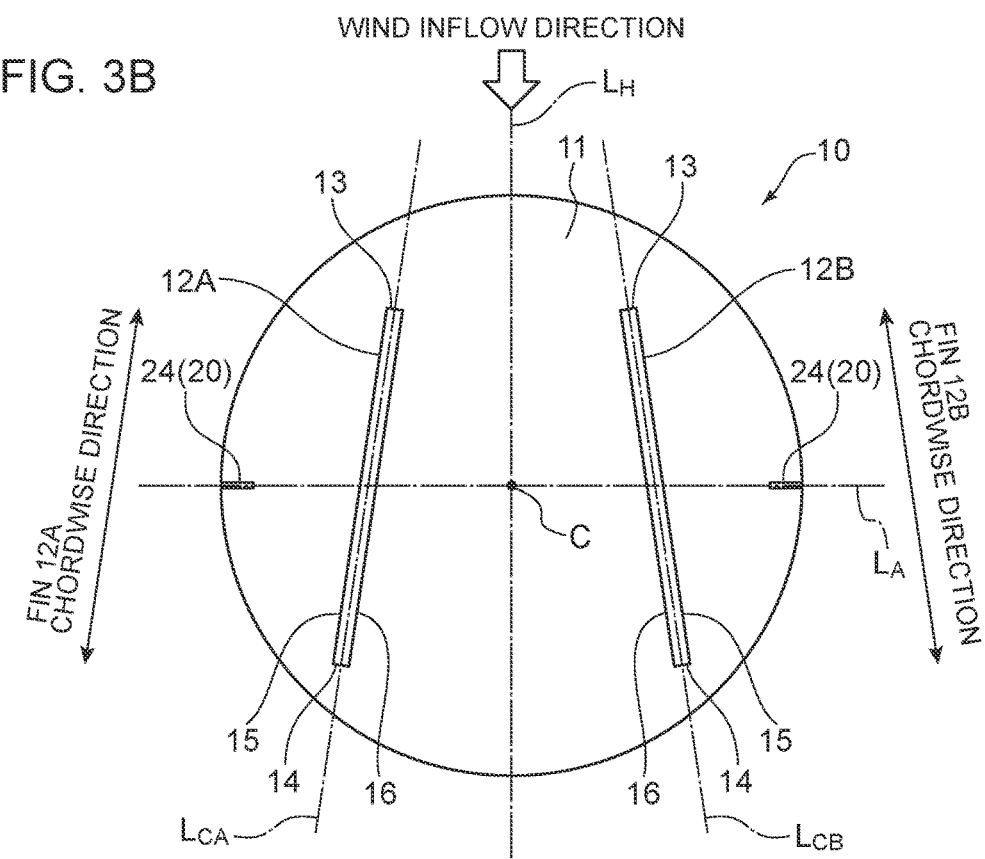
FIG. 3B is a top view of a vortex generator depicted in FIG. 3A.
Figure 4A:
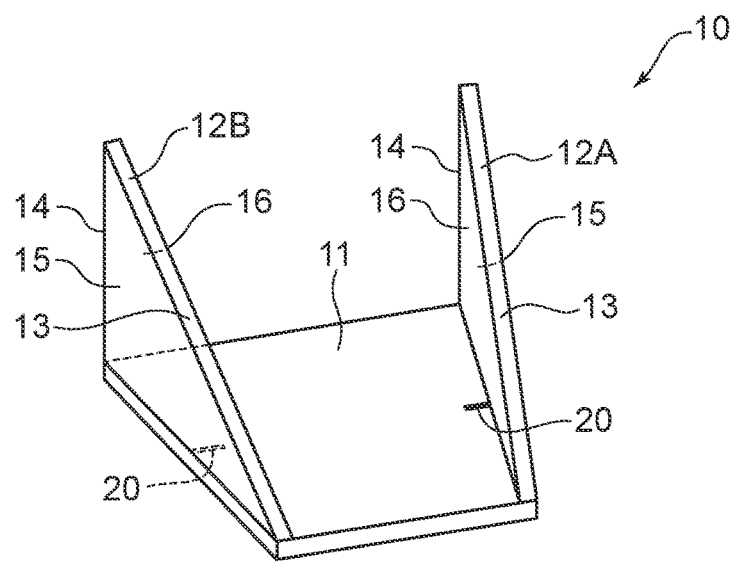
FIG. 4A is a perspective view of a vortex generator to which a mounting method according to an embodiment is to be applied.
Figure 4B:
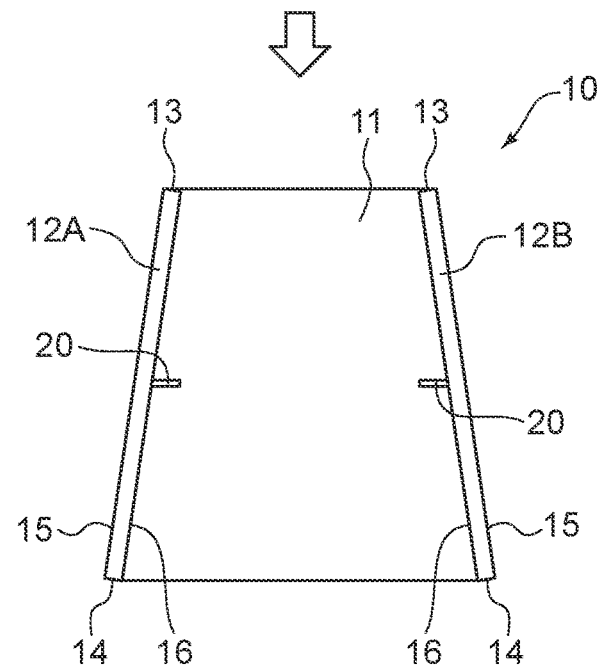
FIG. 4B is a top view of a vortex generator depicted in FIG. 4A.

FIGS. 3A and 4A are each a perspective view of the vortex generator 10 to which a mounting method according to an embodiment is to be applied, and FIGS. 3B and 4B are each a top view of the vortex generator 10 depicted in FIGS. 3A and 4A, respectively.

The vortex generator 10 includes a platform portion 11 to be fixed to a surface of the wind turbine blade 1 (more specifically, to a surface of the blade body 2) and at least one fin 12 disposed upright on the platform portion 11. In the embodiment depicted in FIGS. 3A to 4B, the vortex generator 10 includes a pair (two in total) of fins 12 (12A, 12B) disposed so as to be adjacent to each other on the platform portion 11.

In the embodiment depicted in FIGS. 3A and 3B, the platform portion 11 has a circular shape in a top view. In the embodiment depicted in FIGS. 4A and 4B, the platform portion 11 has a trapezoidal shape in a top view.

In some embodiments, the platform portion 11 may have a shape other than a circle or a trapezoid. For instance, the platform portion 11 may have an oval shape, or may have a polygonal shape such as a rectangular shape.

In an embodiment illustrated in FIGS. 3A to 4B, the fin 12 has an airfoil shape. The fin 12 includes a leading edge 13 disposed on an upstream side with respect to an inflow direction of wind, a trailing edge 14 disposed on a downstream side with respect to the inflow direction of wind, a pressure surface 15 of the fin 12 facing toward upstream with respect to the inflow direction of wind, and a suction surface 16 of the fin 12 facing toward downstream with respect to the inflow direction of wind. In this fin 12, the direction of a line connecting the leading edge 13 and the trailing edge 14 is the chordwise direction of the fin 12.

In some embodiments, the fin 12 is disposed inclined to form a predetermined angle with the inflow direction of wind.

For instance, in the vortex generator 10 depicted in FIGS. 3A to 4B, each of the fins 12A, 12B is disposed so that a gap between the pair of fins 12A, 12B widens from upstream toward downstream with respect to the inflow direction of wind (i.e., from the side of the leading edge 6 toward the side of the trailing edge 7 of the wind turbine blade 1 (see FIG. 2) while the vortex generator 10 is mounted to the wind turbine blade 1).

In some embodiments, each of the fins 12A, 12B may be disposed so that a gap between the pair of fins 12A, 12B widens from downstream toward upstream with respect to the inflow direction of wind (i.e., from the side of the trailing edge 7 toward the side of the leading edge 6 of the wind turbine blade 1 (see FIG. 2) while the vortex generator 10 is mounted to the wind turbine blade 1).

A function of the vortex generator 10 will now be described briefly.

Separation of a flow at the suction surface 9 of the wind turbine blade 1 takes place due to a boundary layer becoming gradually thicker from a streamline flow region in the vicinity of the leading edge 6 toward a turbulent flow region downstream thereof, and the flow being separated before arriving at the trailing edge 7.

The vortex generator 10 mounted to the wind turbine blade 1 normally generates a longitudinal vortex on the side of the suction surface 16 of the fin 12 with a lift produced by the fin 12. Further, in response to a flow flowing into the fin 12, a longitudinal vortex is generated along an edge extending from the upstream-most position 13a toward the top portion 13b of the leading edge 13 of the fin 12. The longitudinal vortices generated by the fin 12 promote momentum exchange between outside and inside of a boundary layer on a surface of the wind turbine blade 1, in a height direction of the fin 12, at a downstream side of the vortex generator 10. Accordingly, the boundary layer on the surface of the wind turbine blade 1 reduces in thickness, and thereby trailing-edge separation of the wind turbine blade 1 is suppressed.

The vortex generator 10 may be disposed within a turbulent flow region of a wind flow along the suction surface 9, on the suction surface 9 of the blade body 2. As described above, the vortex generator 10 is disposed within a turbulent flow region of a wind flow along the suction surface 9, and thereby it is possible to suppress separation of a flow from the suction surface 9.

In some embodiments, as depicted in FIGS. 3A to 4B, the vortex generator 10 includes a mark 20 indicating orientation of the vortex generator 10.

In the embodiments depicted in FIGS. 3A to 4B, a mark 20 is formed on each of a pair of opposite positions in an outer edge region of the platform portion 11. Herein, a pair of opposite positions in the outer edge region of the platform portion 11 is a pair of positions facing each other across an inner region surrounded by the outer edge region, in the outer edge region of the platform portion 11.

During operation, wind normally flows into the wind turbine power generating apparatus 90 from the leading edge 6 toward the trailing edge 7 of the wind turbine blade 1. Thus, for the wind turbine blade 1, by defining in advance a reference direction that serves as a reference of a mounting direction of the vortex generator 10, and adjusting a mounting angle of the vortex generator 10 so that a direction indicated by the marks 20 of the vortex generator 10 forms a predetermined angle with the reference direction, it is possible to mount the vortex generator 10 to the wind turbine blade 1 in a suitable mounting direction with respect to the inflow direction of wind.

In the embodiment depicted in FIGS. 3A and 3B, the platform portion 11 has a circular shape in a top view, and a line $L_A$ connecting the pair of opposite positions at which the respective marks 20 are provided passes through the center C of the circular shape of the platform portion 11. The line $L_A$ is orthogonal to the bisector $L_H$ of an angle formed by chordwise directions of the two fins 12 (12A, 12B) (an angle formed by lines $L_{C1}$, $L_{C2}$ extending in respective chordwise directions). Furthermore, the marks 20 are each a reference mark 24 disposed on the line $L_A$.

The marks 20 of the vortex generator 10 according to some embodiments for indicating the orientation of the vortex generator 10 may include an angle-indicating mark (described below) 25 at every predetermined angle about the center C of the platform portion 11, in addition to the reference marks 24.

Next, a method of mounting the vortex generator 10 to the wind turbine blade 1 according to some embodiments will be described with reference to FIGS. 5A to 18. FIG. 18 is a flowchart of a method of mounting a vortex generator 10 according to an embodiment.

While the vortex generator 10 is mounted to the suction surface 9 of the wind turbine blade 1 (blade body 2) in the following description for example, the vortex generator 10 can be mounted to the pressure surface 8 of the wind turbine blade 1 by a similar method.

As depicted in FIG. 18, the method of mounting the vortex generator 10 according to some embodiments includes a step (S2) of determining the mounting position of the vortex generator (VG) 10, a step (S4) of specifying reference points with respect to the wind turbine blade 1, a step (S6) of setting a line which connects the reference points, and a step (S8) of mounting the vortex generator 10 to the wind turbine blade 1. Each step will now be described.

(Step (S2) of Determining the Mounting Position of the Vortex Generator)

In the method of mounting the vortex generator 10 according to some embodiments, the mounting position of each vortex generator 10 on the surface of the wind turbine blade 1 is determined.

In an embodiment, the mounting position of each vortex generator 10 is determined on the basis of a fluid-analysis result on the wind turbine blade 1.

In an embodiment, an ideal mounting position of each vortex generator 10 on the wind turbine blade 1 is calculated from fluid analysis on the wind turbine blade 1, and the ideal mounting position may be determined as the position for actually mounting each vortex generator 10.

In an embodiment, ideal mounting positions of the plurality of vortex generators 10 indicated by a fluid-analysis result on the wind turbine blade 1 may be approximated by one or more lines, and the mounting positions of the plurality of vortex generators 10 may be determined on the line.

(Adjusting an Azimuth Angle of a Wind Turbine Blade to which a Vortex Generator is to be Mounted)

Before performing the following works (specifying reference points on the wind turbine blade 1, and mounting the vortex generator 10 to the wind turbine blade 1), an azimuth angle of the wind turbine rotor 93 may be adjusted so that the wind turbine blade 1 to which the vortex generator 10 is to be mounted is positioned lowermost in the hub 94 (i.e., so that the wind turbine blade 1 is positioned at an azimuth angle at which the wind turbine blade 1 extends downward in a substantially vertical direction from the hub 94). With the wind turbine blade 1 subject to mounting being positioned lowermost in the hub 94, operators can move in the vertical direction between the blade root 3 and the blade tip 4 during the works, which makes it possible to perform the works efficiently.

(Step (S4) of Specifying Reference Points with Respect to a Wind Turbine Blade)

Next, positions of at least two reference points ($P_1$, $P_2$ . . . ) having different coordinates in the blade spanwise direction of the wind turbine blade 1 are specified on the wind turbine blade 1. Herein, the reference points are points for determining the line $L_{ref}$ indicating a reference direction which serves as a reference of a mounting direction of the vortex generator 10, and the positions of the reference points on the surface (suction surface 9 in this case) of the wind turbine blade 1 are determined in advance. It is sufficient if the reference points ($P_1$, $P_2$ . . . ) are points whose position can be specified on the wind turbine blade 1. For instance, the reference points ($P_1$, $P_2$ . . . ) may be points determined on the basis of a predetermined mounting position or the like of the vortex generator 10. Furthermore, the reference points ($P_1$, $P_2$ . . . ) may be the same point as the predetermined mounting position (mounting coordinate) of the vortex generator 10.

In some embodiments, the position of each of the reference points ($P_1$, $P_2$, . . . ) is specified on the basis of: the length l along the surface of the wind turbine blade 1 in the chordwise direction from the trailing edge 7 of the wind turbine blade or from a blade spanwise directional line Ls extending along the blade spanwise direction on the surface of the wind turbine blade 1; and the distance z in the blade spanwise direction from the blade root 3 or the blade tip 4 of the wind turbine blade 1.

The blade spanwise directional line Ls is a line extending in the blade spanwise direction at a position between the leading edge 6 and the trailing edge 7 in the chordwise direction on the blade surface (suction surface 9).

Figure 5A:
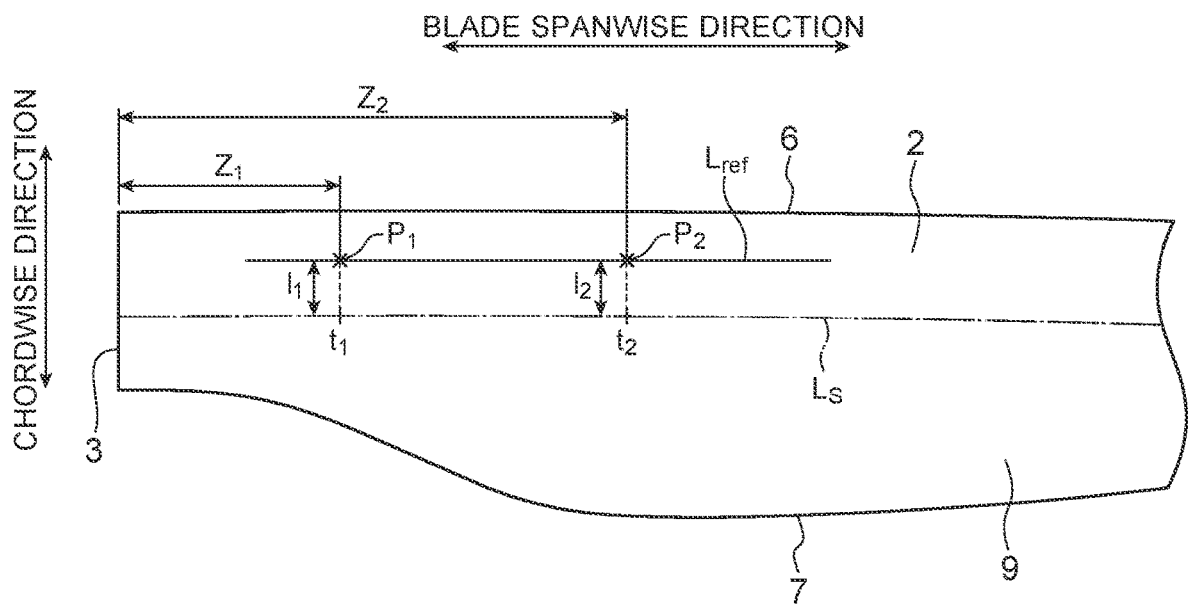
FIG. 5A is a diagram for describing a step of specifying a reference point on a wind turbine blade according to an embodiment.
Figure 5B:
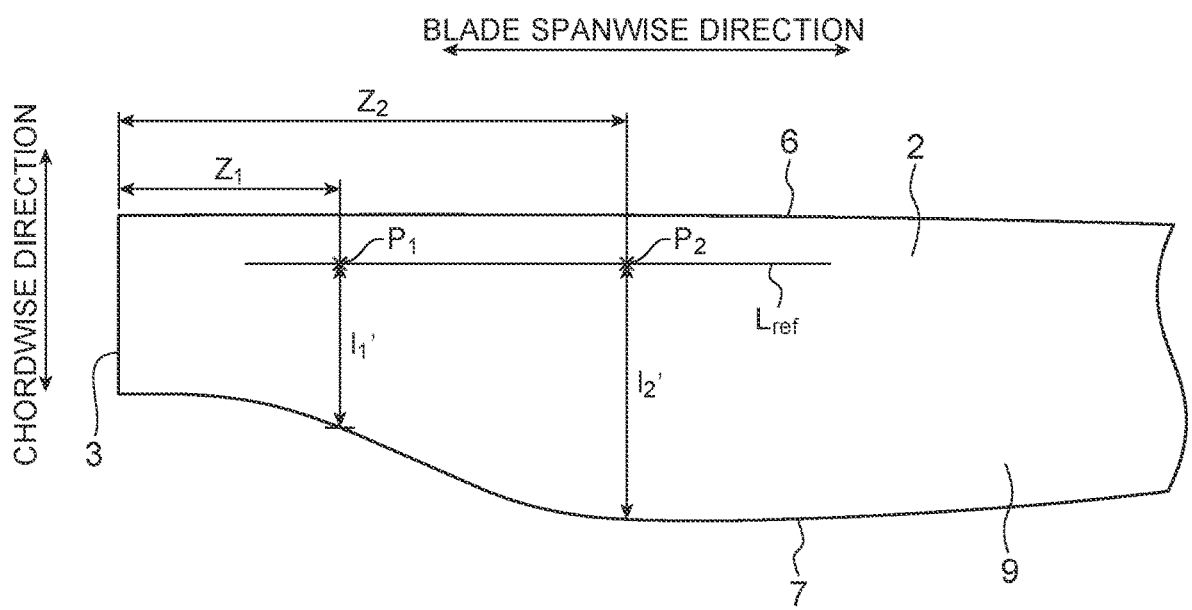
FIG. 5B is a diagram for describing a step of specifying a reference point on a wind turbine blade according to an embodiment.
Figure 6:
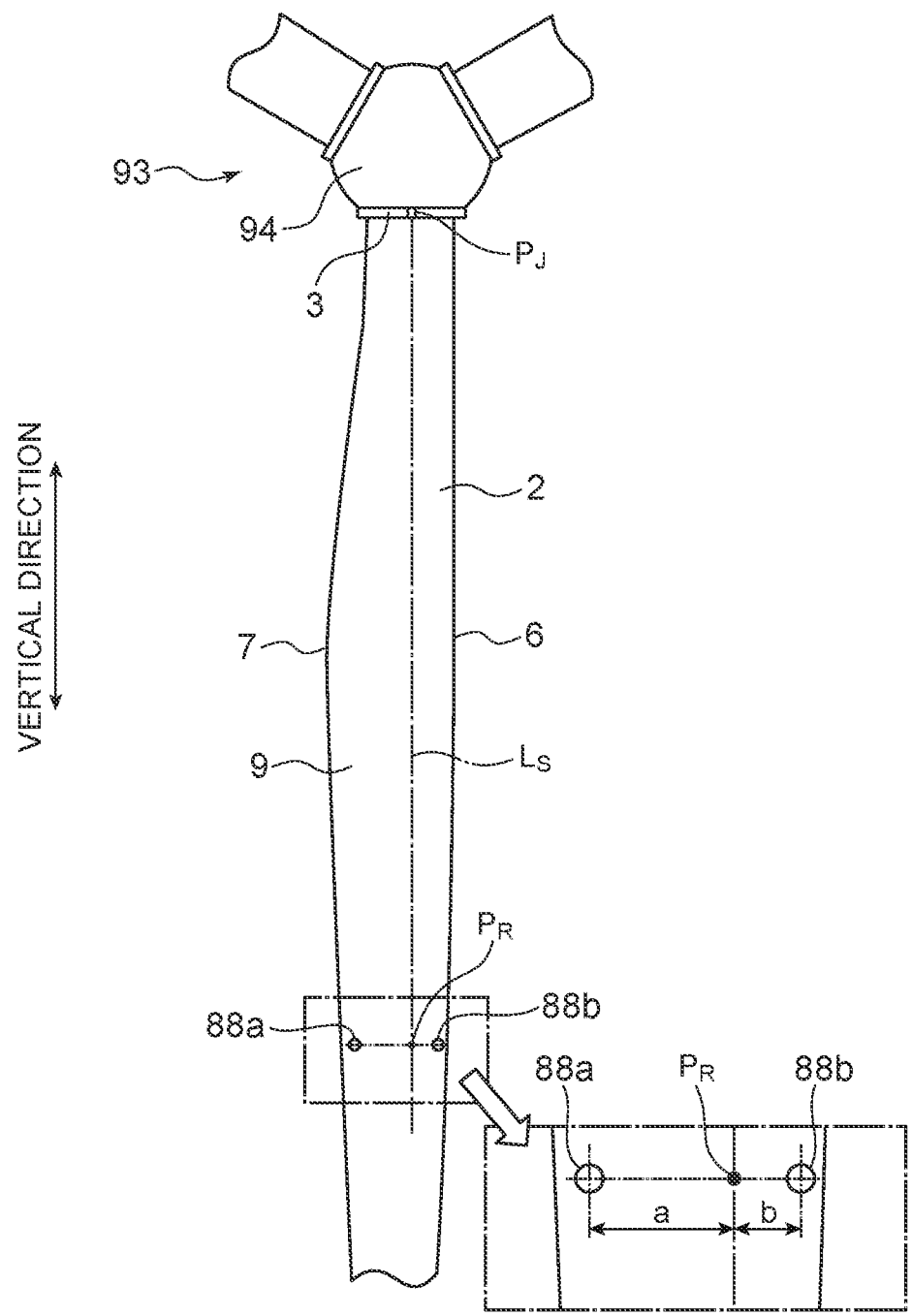
FIG. 6 is a diagram for describing a step of specifying a reference point on a wind turbine blade according to an embodiment.

FIGS. 5A to 6 are each a diagram for describing a step (S4) of specifying a reference point with respect to the wind turbine blade 1 according to an embodiment.

To describe in more detail with reference to FIGS. 5A and 5B, two reference points $P_1$ and $P_2$ specified on the surface (suction surface 9) of the wind turbine blade 1 are depicted in the drawings. The positions of the reference points $P_1$ and $P_2$ on the surface of the wind turbine blade 1 can be expressed as $P_1$ ($z_1$, $l_1$), $P_2$ ($z_2$, $l_2$), and so on, by using the above described z and l.

In the example depicted in FIG. 5A, the blade spanwise directional line Ls extending along the blade spanwise direction of the wind turbine blade 1 is drawn. The blade spanwise directional line Ls can be drawn with reference to the position of a member (e.g. receptor) mounted to a specific position on the surface of the wind turbine blade 1, for instance.

Then, on the blade spanwise directional line Ls, points at distance of $z_1$ and $z_2$, respectively, measured from the blade root 3 (distance in the blade spanwise direction) are determined as $t_1$ and $t_2$, respectively. The distance from the blade root 3 in the blade spanwise direction may be measured by a laser measuring tool, for example.

Next, points at length $l_1$ and $l_2$ measured along the surface of the wind turbine blade 1 in the chordwise direction from the points $t_1$ and $t_2$ on the blade spanwise directional line Ls are specified as the reference points $P_1$ and $P_2$.

In the example depicted in FIG. 5B, the trailing edge 7 of the wind turbine blade 1 is used as a reference for specifying the positions of the reference points $P_1$ and $P_2$ in the chordwise direction. Specifically, at the positions at distance $z_1$ and $z_2$ from the blade root 3 in the blade spanwise direction, points at length $l_1'$ and $l_2'$ measured along the surface of the wind turbine blade 1 in the chordwise direction from the trailing edge 14 of the wind turbine blade 1 can be specified as the reference points $P_1$ and $P_2$.

Described below is an example of a process of drawing the blade spanwise directional line Ls as shown in FIG. 5A, with reference to the position of a receptor mounted to the wind turbine blade 1.

As depicted in FIG. 6, the wind turbine blade 1 is positioned at the lowermost part of the hub 94 (i.e., positioned at such an azimuth angle that the wind turbine blade 1 extends downward in a substantially vertical direction from the hub 94).

Then, a line is drawn to connect a predetermined position $P_J$ on the blade root 3 and a predetermined position $P_R$ determined on the basis of the positions of the receptors 88a, 88b mounted to the surface of the wind turbine blade 1, and the line serves as the blade spanwise directional line Ls. The predetermined position $P_R$ determined with reference to the positions of the receptors 88a, 88b is a position calculated in advance from the positional relationship with the predetermined position $P_J$ at the blade root 3 so as to obtain a desired blade spanwise directional line Ls. Furthermore, for instance as depicted in FIG. the 6, predetermined position $P_R$ may be designated as a point that divides a segment connecting the receptors 88a, 88b at the ratio of a:b.

The blade spanwise directional line Ls may be drawn with a pen, or marked with a tape or a string, for instance, to be visually recognizable.

(Step (S6) of Setting Line $L_{ref}$ Connecting Reference Points)

Figure 7:
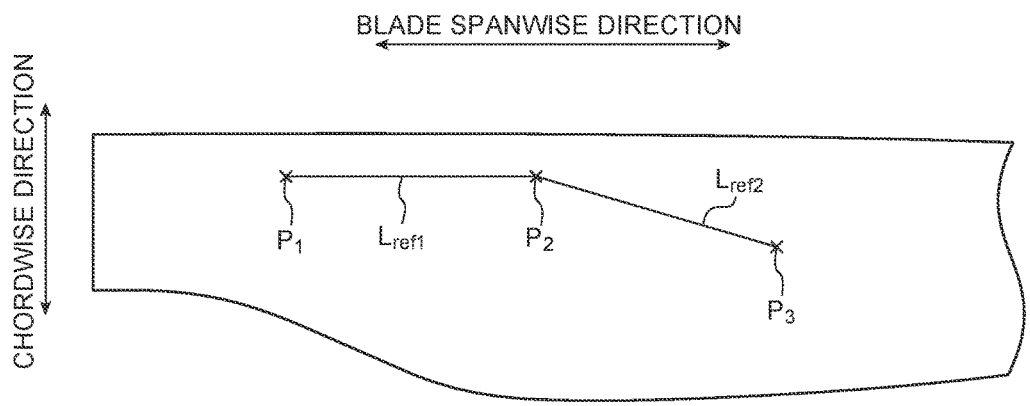
FIG. 7 is a diagram for describing a step of setting a line connecting reference points according to an embodiment.

FIG. 7 is a diagram for describing a step (S6) of setting the line $L_{ref}$ connecting reference points according to an embodiment.

The reference points ($P_1$, $P_2$ . . . ) are specified as described above, and thereby the line $L_{ref}$ connecting the reference points ($P_1$, $P_2$) is set (see FIG. 5A or 5B). The line $L_{ref}$ serves as a reference in adjusting a mounting direction of the vortex generator 10 in the following step of mounting the vortex generator 10. In other words, the direction of the line $L_{ref}$ is the reference direction to be referred to in mounting the vortex generator 10.

The line $L_{ref}$ indicating the reference direction may be the same line as the at least one approximate line obtained on the basis of a fluid-analysis result on the wind turbine blade 1 (i.e., at least one approximate line of ideal mounting positions of the plurality of vortex generators 10 indicated by a fluid-analysis result). In other words, such points that the line $L_{ref}$ connecting the reference points becomes the approximate line may be selected as the reference points ($P_1$, $P_2$ . . . ).

Further, two or more lines $L_{ref}$ connecting the reference points ($P_1$, $P_2$) may be set on the wind turbine blade 1. For instance, in the example depicted in FIG. 7, a line $L_{ref1}$ connecting the reference points $P_1$ and $P_2$, and a line $L_{ref2}$ connecting the reference points $P_2$ and $P_3$, are set.

Further, if the ideal mounting positions of the plurality of vortex generators 10 indicated by a fluid-analysis result on the wind turbine blade 1 are approximated by two lines, two lines $L_{ref}$ on the wind turbine blade 1 may be set on the basis of the two approximate lines. For instance, the lines $L_{ref1}$ and $L_{ref2}$ depicted in FIG. 7 may be the same lines as the two approximate lines described above.

The line $L_{ref}$ set as described above for the wind turbine blade 1 may be displayed visually on the surface of the wind turbine blade 1. For instance, the line $L_{ref}$ may be displayed on the surface of the wind turbine blade 1 by using a tape or a pen, or by marking off, for instance.

(Step (S8) of Mounting a Vortex Generator to a Wind Turbine Blade)

The reference points ($P_1$, $P_2$ . . . ) are specified as described above, and the line $L_{ref}$ connecting the reference points is set, and then, the mounting direction of the vortex generator 10 is adjusted with reference to the line $L_{ref}$ connecting the reference points, and the vortex generator 10 is mounted to the wind turbine blade 1.

Figure 8:
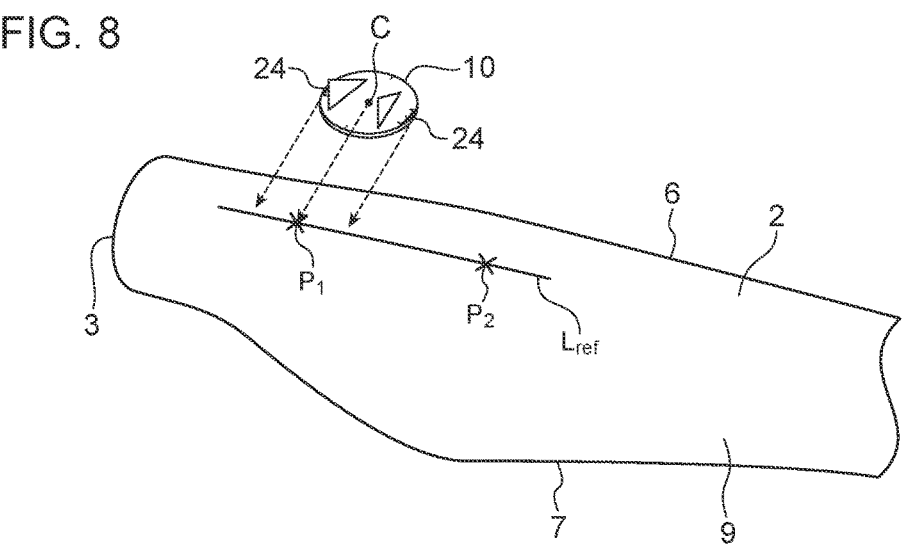
FIG. 8 is a diagram for describing the process of a step of mounting a vortex generator to a wind turbine blade according to an embodiment.

In some embodiments, the mounting direction of the vortex generator 10 is adjusted by aligning the marks 20 indicating orientation of the vortex generator 10 along the line $L_{ref}$. This embodiment will now be described with reference to FIGS. 8 to 10. FIGS. 8 to 10 are each a diagram for describing the process of the step (S8) of mounting the vortex generator 10 to the wind turbine blade 1 according to an embodiment.

Next, as depicted in FIG. 8, the vortex generator 10 is located on the surface (suction surface 9 in this case) of the wind turbine blade 1, so that the reference mark 24 (mark 20) indicating orientation of the vortex generator 10 is disposed along the line $L_{ref}$ connecting the reference points $P_1$ and $P_2$.

At this time, the vortex generator 10 is located in such a way that a reference point (e.g. the center C of the platform portion 11 having a circular shape) of the vortex generator 10 is in a predetermined mounting position in the blade spanwise direction. Furthermore, the mounting position of the vortex generator 10 in the blade spanwise direction may be the same as the reference point $P_1$ or the reference point $P_2$.

Figure 9A:
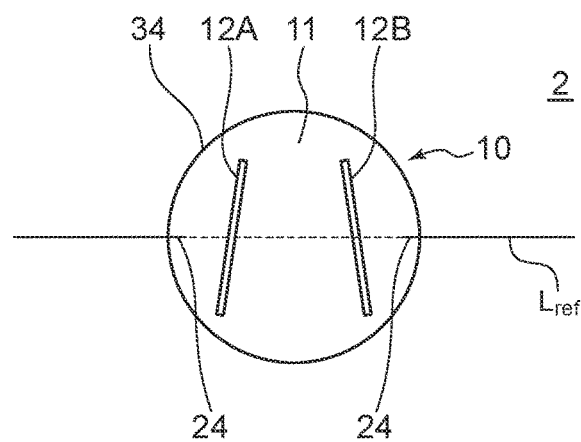
FIG. 9A is a diagram for describing the process of a step of mounting a vortex generator to a wind turbine blade according to an embodiment.
Figure 10:
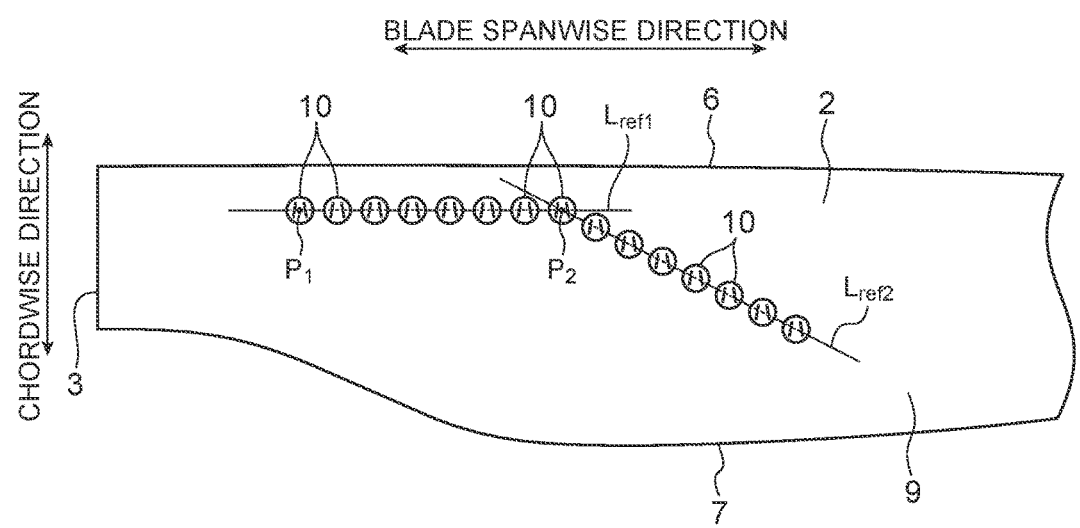
FIG. 10 is a diagram for describing the process of a step of mounting a vortex generator to a wind turbine blade according to an embodiment.

In FIG. 9A, depicted is the vortex generator 10 located on the blade surface of the wind turbine blade 1 as described above.

Figure 9B:
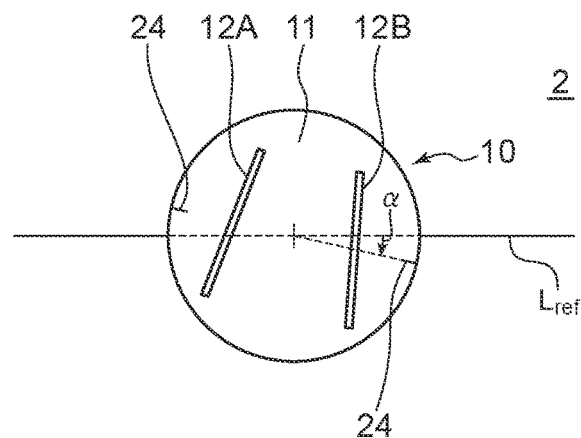
FIG. 9B is a diagram for describing the process of a step of mounting a vortex generator to a wind turbine blade according to an embodiment.
Figure 9C:
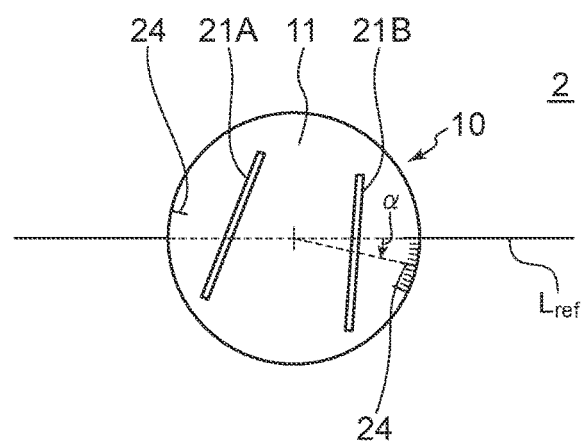
FIG. 9C is a diagram for describing the process of a step of mounting a vortex generator to a wind turbine blade according to an embodiment.

Next, as depicted in FIG. 9B or 9C, the mounting angle of the vortex generator 10 is adjusted by revolving the vortex generator 10 about the center C of the platform portion 11 by a predetermined mounting angle α.

The marks 20 of the vortex generator 10 depicted in FIG. 9C include angle-indicating marks (scale) 25 at every predetermined angle about the center C of the platform portion 11, in addition to the reference marks 24. With the vortex generator 10 having such a configuration, the vortex generator 10 is revolved about the center C of the platform portion 11 so that the angle-indicating marks 25, which form an angle α with the reference mark 24 about the center C of the platform portion 11, are along the line $L_{ref}$, as depicted in FIG. 9C. Accordingly, it is possible to adjust the mounting angle of the vortex generator 10 readily.

The mounting position and the mounting angle of the vortex generator 10 on the wind turbine blade 1 are adjusted as described above, and then the vortex generator 10 is fixed to the wind turbine blade 1. At this time, the vortex generator 10 may be fixed to the wind turbine blade 1 by using an adhesive agent or a double-sided adhesive tape.

Furthermore, as depicted in FIG. 10, a plurality of vortex generators 10 may be aligned linearly along the line $L_{ref}$, and the mounting direction of each vortex generator 10 may be adjusted with reference to the line $L_{ref}$, thereby mounting the plurality of vortex generators 10 to the wind turbine blade 1. As described above, with the plurality of vortex generators 10 mounted to the wind turbine blade 1 with reference to of the single line $L_{ref}$, it is possible to mount the vortex generators 10 efficiently to the wind turbine blade 1.

In the example depicted in FIG. 10, the vortex generators 10 are aligned linearly and mounted to the wind turbine blade 1, along each of the line $L_{ref1}$ connecting the reference points $P_1$ and $P_2$ and the line $L_{ref2}$ connecting the reference points $P_2$ and $P_3$, on the surface of the wind turbine blade 1.

According the above described mounting method, the positions of the reference points ($P_1, P_2, \ldots$) are specified on the wind turbine blade 1 on the basis of: the length 1 along the surface of the wind turbine blade 1 in the chordwise direction from the trailing edge 7 of the wind turbine blade 1 or the blade spanwise directional line Ls; and the distance z in the blade spanwise direction from the blade root 3 or the blade tip 4 of the wind turbine blade 1, and thereby the positions of the reference points ($P_1, P_2, \ldots$) can be reliably specified on the wind turbine blade 1.

Furthermore, according to the above described mounting method, at least two points at different coordinates in the blade spanwise direction of the wind turbine blade 1 are used as the reference points ($P_1, P_2 \ldots$) for determining the line $L_{ref}$, which indicates a reference direction that serves as a reference in mounting the vortex generator 10. Thus, a longer distance can be ensured between the two points than in a case where two or more points at different coordinates in the chordwise direction of the wind turbine blade 1 are used as reference points, and thus misalignment of reference points specified on the wind turbine blade 1 results in a smaller error in the direction of the line connecting the reference points (reference direction). Thus, according to the above described mounting method, it is possible to specify the line $L_{ref}$ indicating the reference direction for mounting the vortex generators 10 on the surface of the wind turbine blade 1, with accuracy, and thereby it is possible to mount the vortex generators 10 to the wind turbine blade 1 in a suitable mounting direction with respect to an inflow direction of wind.

In some embodiments, in the step of mounting the vortex generator 10 to the wind turbine blade 1, a template described below is used to adjust the mounting direction of the vortex generator 10. This embodiment will be described with reference to FIGS. 11 to 17C.

Figure 11:
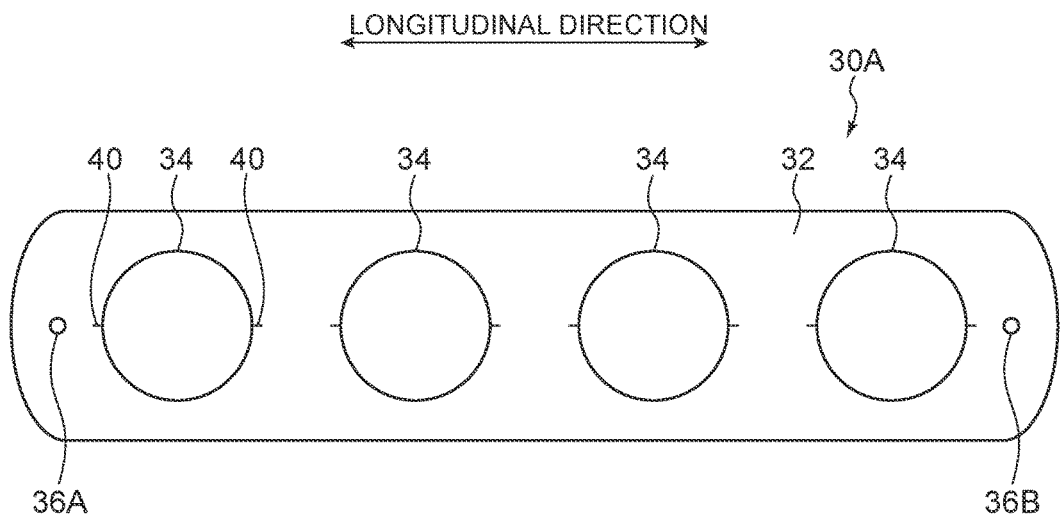
FIG. 11 is a configuration diagram of a template according to an embodiment.
Figure 14:
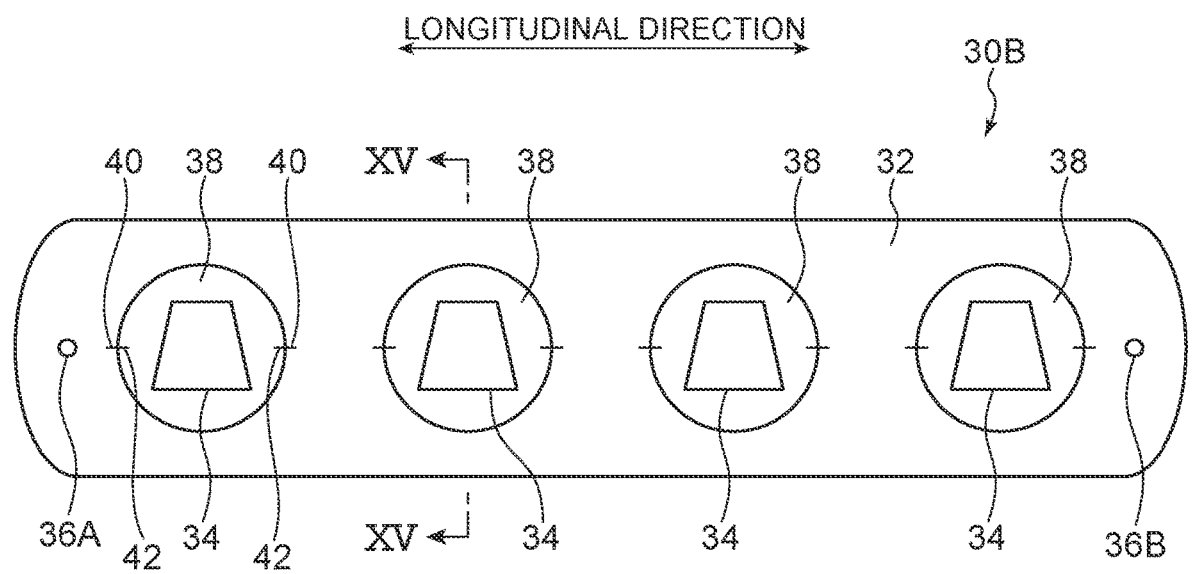
FIG. 14 is a configuration diagram of a template according to an embodiment.
Figure 15:
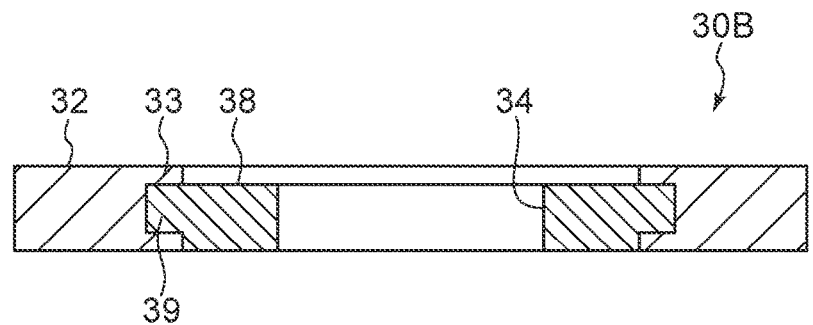
FIG. 15 is a cross-sectional view of the template in FIG. 14, taken along line XV-XV.

With reference to FIGS. 11, 14, and 15, the configuration of the template according to some embodiments will be described. FIGS. 11 and 14 are each a configuration diagram of a template according to an embodiment. FIG. 15 is a cross-sectional view taken along line XV-XV in FIG. 14.

As depicted in FIGS. 11 and 14, a template 30 (30A, 30B) includes a template body 32, and at least one opening 34 having a shape corresponding to the outline of the platform portion 11 of the vortex generator 10.

The opening 34 of the template 30A depicted in FIG. 11 has a circular shape, and has a shape corresponding to the outline of the platform portion 11 of the vortex generator 10 depicted in FIGS. 3A and 3B, for instance. The opening 34 of the template 30B depicted in FIG. 14 has a trapezoidal shape, and has a shape corresponding to the outline of the platform portion 11 of the vortex generator 10 depicted in FIGS. 4A and 4B, for instance.

The template 30 (30A, 30B) depicted in FIGS. 11 and 14 has four openings 34 aligned along the longitudinal direction of the template 30 (30A, 30B).

The template 30 (30A, 30B) depicted in FIGS. 11 and 14 is configured to support the vortex generators 10 rotatably while the platform portions 11 of the vortex generators 10 are fitted in the openings 34.

In the embodiment depicted in FIG. 11, the openings 34 are formed on the template body 32 of the template 30A, and thereby the platform portions 11 of a circular shape can be fitted into the openings 34. Then, while the platform portions 11 are fitted in the openings 34, the vortex generators 10 can be rotated relative to the template body 32.

In the embodiment depicted in FIG. 14, the template 30B has rotary parts 38 mounted rotatably to the template body 32, and the openings 34 are formed on the rotary parts 38, and thereby it is possible to fit the platform portions 11 of a trapezoidal shape into the openings 34. As depicted in FIGS. 14 and 15, each of the rotary parts 38 has a circular shape, and includes a protruding portion 39 protruding outward in the radial direction at an outer edge portion of the rotary part 38. Further, a recessed portion 33 which is engageable with the protruding portion 39 is formed on the template body 32. With the protruding portion 39 of the rotary part 38 and the recessed portion 33 of the template body 32 in engagement with each other, the rotary part 38 is rotatable with respect to the template body 32.

With the template 30 (30A, 30B) having such a configuration, the vortex generators 10 revolve with respect to the template body 32 by revolving the rotary parts 38 relative to the template body 32 while the platform portions 11 are fitted in the openings 34.

As depicted in FIGS. 11 and 14, the template 30 (30A, 30B) includes direction-aligning marks 36 (36A, 36B) used to align the longitudinal direction of the template 30 (30A, 30B) along the direction (reference direction) of the line $L_{ref}$ connecting the above described reference points.

Further, a mark 40 is formed around each opening 34 of the template body 32, to be disposed on a line connecting the direction-aligning mark 36A and the direction-aligning mark 36B. The marks 40 indicate orientation of the vortex generator 10 to be fitted into the opening 34.

Furthermore, in the template 30B depicted in FIG. 14, a mark 42 is formed on an outer edge portion of the rotary part 38, the mark 42 indicating an angle of the rotary part 38 with reference to the mark 40 formed on the template body 32.

Next, the step (S8) of mounting the vortex generator 10 to the wind turbine blade 1 by using the template 30 (30A, 30B) will be described. FIGS. 12 to 13C, and FIGS. 16 to 17C are each a diagram for describing the process of the step (S8) of mounting the vortex generator 10 to the wind turbine blade 1 according to an embodiment.

Figure 12:
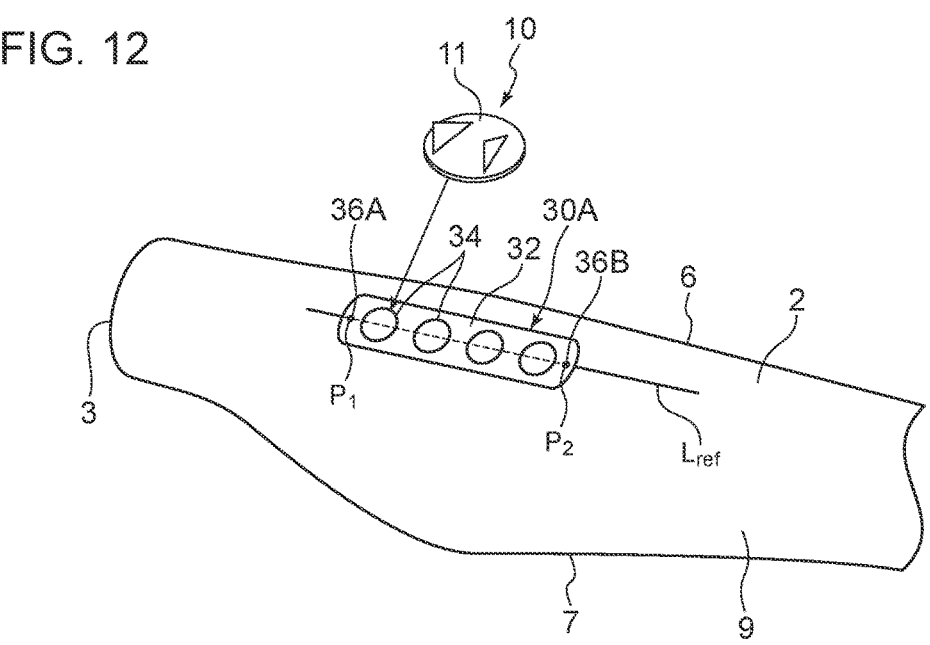
FIG. 12 is a diagram for describing the process of a step of mounting a vortex generator to a wind turbine blade according to an embodiment.
Figure 13A:
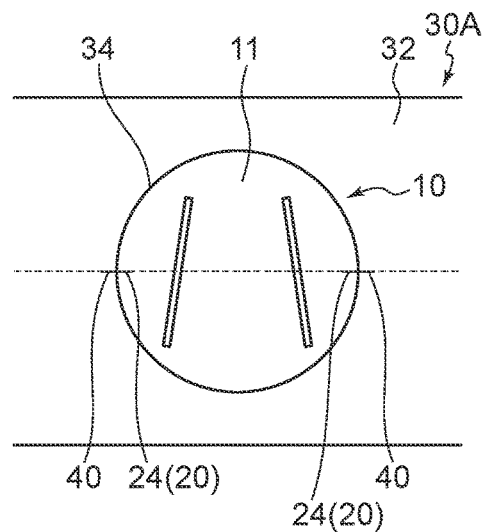
FIG. 13A is a diagram for describing the process of a step of mounting a vortex generator to a wind turbine blade according to an embodiment.
Figure 13B:
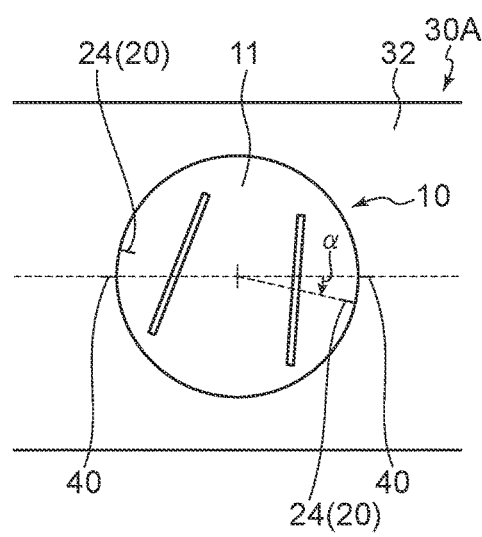
FIG. 13B is a diagram for describing the process of a step of mounting a vortex generator to a wind turbine blade according to an embodiment.
Figure 13C:
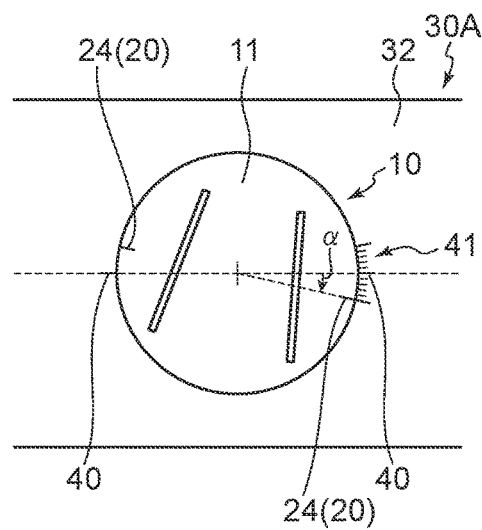
FIG. 13C is a diagram for describing the process of a step of mounting a vortex generator to a wind turbine blade according to an embodiment.
Figure 16:
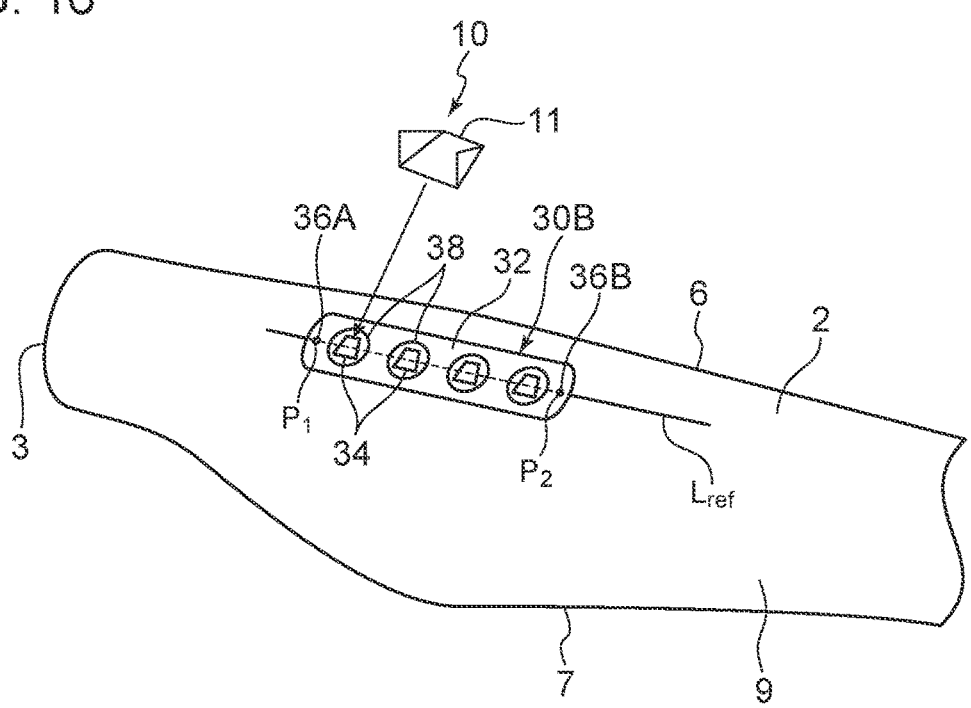
FIG. 16 is a diagram for describing the process of a step of mounting a vortex generator to a wind turbine blade according to an embodiment.
Figure 17A:
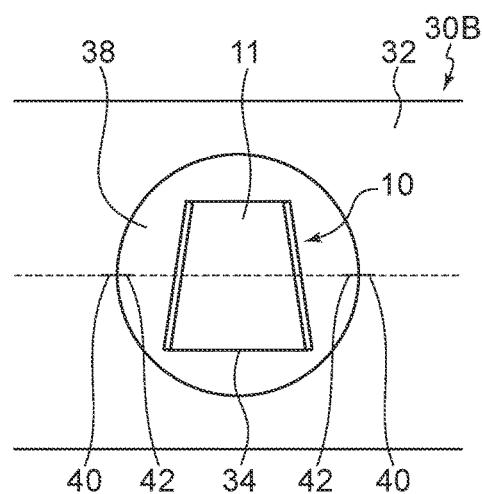
FIG. 17A is a diagram for describing the process of a step of mounting a vortex generator to a wind turbine blade according to an embodiment.
Figure 17B:
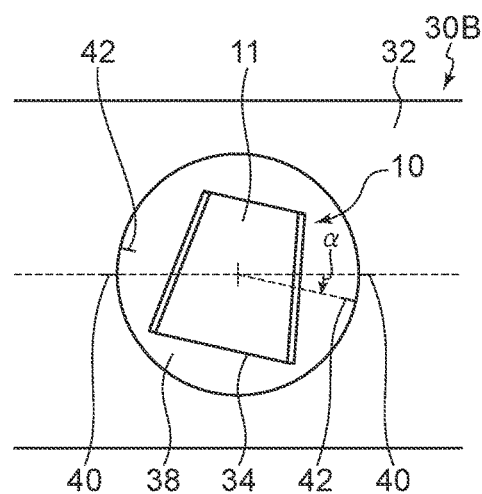
FIG. 17B is a diagram for describing the process of a step of mounting a vortex generator to a wind turbine blade according to an embodiment.
Figure 17C:
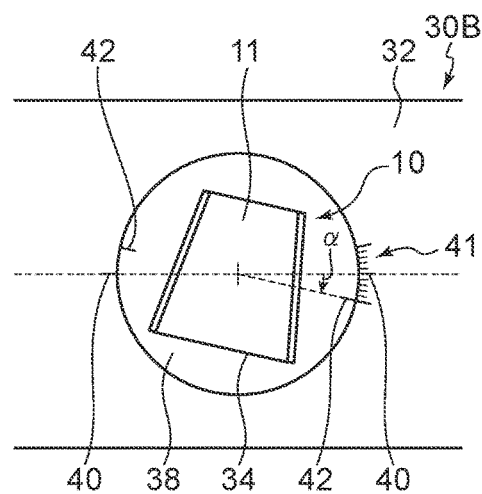
FIG. 17C is a diagram for describing the process of a step of mounting a vortex generator to a wind turbine blade according to an embodiment.
Figure 18:
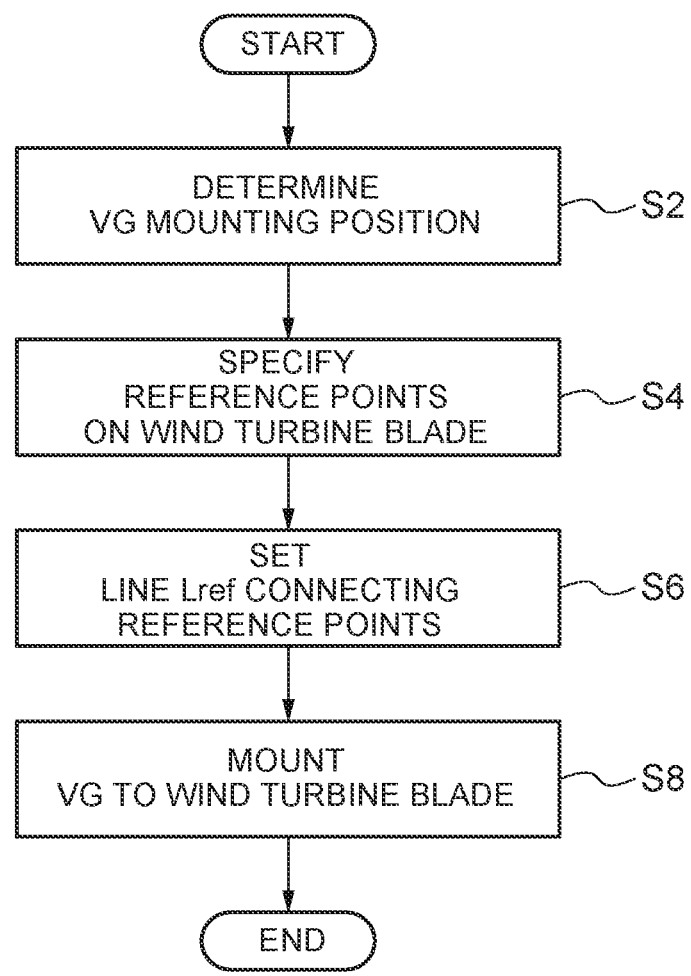
FIG. 18 is a flowchart of a method of mounting a vortex generator 10 according to an embodiment.

FIGS. 12 to 13C correspond to a case using the template 30A depicted in FIG. 11, while FIGS. 16 to 17C correspond to a case using the template 30B depicted in FIG. 14.

As depicted in FIGS. 12 and 16, the template 30 (30A, 30B) is placed on the surface (suction surface 9 in this case) of the wind turbine blade 1 with reference to the line $L_{ref}$. Specifically, the direction-aligning marks 36 (36A, 36B) of the template 30 (30A, 30B) are located on the line $L_{ref}$.

At this time, the positions of the direction-aligning marks 36 (36A, 36B) may be calculated in advance as the reference points $P_1$ and $P_2$, and the template 30 (30A, 30B) may be placed on the wind turbine blade 1 with reference to the line $L_{ref}$ in such a way that the direction-aligning marks 36A and 36B are positioned respectively on the reference points $P_1$ and $P_2$, and thereby the direction-aligning marks 36 (36A, 36B) of the template 30 (30A, 30B) may be located on the line $L_{ref}$.

With the direction-aligning marks 36 (36A, 36B) of the template 30 (30A, 30B) positioned on the line $L_{ref}$ as described above, the marks 40 formed on the template 30 (30A, 30B) are positioned along the line $L_{ref}$.

Then, the platform portion 11 of the vortex generator 10 is fitted into the opening 34 of the template 30 (30A, 30B) placed on the surface (suction surface 9 in this case) of the wind turbine blade 1.

At this time, the platform portion 11 is fitted into the openings 34 so that the vortex generator 10 is oriented in a predetermined direction. For instance, as depicted in FIG. 13A, the platform portion 11 of a circular shape is fitted into the opening 34 of the template 30A so that the reference mark 24 formed on the platform portion 11 faces the mark 40 formed on the template body 32. Alternatively, as depicted in FIG. 17A, the platform portion 11 of a trapezoidal shape is fitted into the opening 34 of the template 30B so that the mark 42 formed on the rotary part 38 faces the mark 40 formed on the template body 32, and then the rotary part 38 is revolved relative to the template body 32.

Next, as depicted in each of FIGS. 13B, 13C, 17B, and 17C, the vortex generator 10 is revolved relative to the template body 32 by a predetermined mounting angle α, and thereby the mounting angle of the vortex generator 10 is adjusted.

At this time, while the platform portion 11 of the vortex generator 10 is fitted in the opening 34 of the template 30 (30A, 30B), the mounting direction of the vortex generator 10 is adjusted with reference to the mark 40 formed on the template 30 (30A, 30B).

For instance, in the example depicted in FIG. 13B, the platform portion 11 of the vortex generator 10 is revolved relative to the template 30A, so that the direction indicated by the reference mark 24 of the vortex generator 10 forms a predetermined angle α with the direction indicated by the mark 40.

For instance, in the example depicted in FIG. 17B, the rotary part 38 is revolved relative to the template 30B (template body 32), so that the direction indicated by the mark 42 of the rotary part 38 into which the vortex generator 10 is fitted in forms a predetermined angle α with the direction indicated by the mark 40 on the template 30B.

Furthermore, for instance, in the example depicted in FIGS. 13C and 17C, the template body 32 includes an angle-indicating mark (scale) 41 at every predetermined angle about the rotational center of each vortex generator 10, in addition to the mark 40. If the template 30 (30A, 30B) of such a configuration is used, as depicted in FIGS. 13C and 17C, the vortex generator 10 is revolved relative to the template body 32, so that the reference mark 24 (in the case of FIG. 13C) or the mark 42 (in the case of FIG. 17C) faces the angle-indicating mark 41 forming an angle α with the reference mark 24 (in the case of FIG. 13C) or the mark 42 (in the case of FIG. 17C). Accordingly, it is possible to adjust the mounting angle of the vortex generator 10 readily.

The mounting position and the mounting angle of the vortex generator 10 on the wind turbine blade 1 are adjusted as described above, and then the vortex generator 10 is fixed to the wind turbine blade 1. At this time, the vortex generator 10 may be fixed to the wind turbine blade 1 by using an adhesive agent or a double-sided adhesive tape.

Further, since the template 30 (30A, 30B) includes the plurality of openings 34 aligned along the longitudinal direction of the template, it is possible to fit the platform portions 11 of the plurality of vortex generators 10 into the respective openings 34, and thereby to align the plurality of vortex generators 10 linearly along the line $L_{ref}$ indicating the reference direction. Accordingly, positioning and mounting can be performed at the same time for the plurality of vortex generators 10, and thus it is possible to mount the vortex generators 10 to the wind turbine blade 1 efficiently.

As described above, the vortex generators are revolved while the platform portions are fitted in the template, and thereby it is possible to adjust the mounting direction of the vortex generators readily and to mount the vortex generators efficiently to the wind turbine blade.

Embodiments of the present invention were described in detail above, but the present invention is not limited thereto, and various amendments and modifications may be implemented.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

The invention claimed is:

1. A method of mounting a vortex generator to a wind turbine blade, comprising:
   a step of locating a measurement point comprising a step of measuring a length along a surface of the wind turbine blade in a chordwise direction from a trailing edge of the wind turbine blade or from a blade spanwise directional line extending along a blade spanwise direction of the wind turbine blade on the surface of the wind turbine blade;
   a step of locating positions of at least two reference points at different coordinates in the blade spanwise direction of the wind turbine blade on the wind turbine blade; and
   a step of adjusting a mounting direction of the vortex generator and mounting the vortex generator to the wind turbine blade, with reference to a line connecting the reference points,
   wherein the step of locating the positions of the reference points comprises locating the position of each of the reference points on the surface of the wind turbine blade based on the measured length and a distance in the blade spanwise direction from a blade root or from a blade tip of the wind turbine blade,
   wherein a platform portion of the vortex generator has a circular shape in a top view,
   wherein the vortex generator includes a pair of marks disposed at a pair of opposite positions in an outer edge region of the platform portion of the vortex generator, the pair of marks being located on a center line passing through a center of the circular shape of the platform portion such that the pair of marks indicate orientation of the vortex generator, and wherein the mounting direction of the vortex generator is adjusted with reference to the line by aligning the pair of marks along the line.

2. The method of mounting a vortex generator according to claim 1,
wherein the step of locating the positions of the reference points comprises measuring a distance in the blade spanwise direction from the blade root or from the blade tip of the wind turbine lade with a laser meter.

3. The method of mounting a vortex generator according to claim 1, further comprising a step of visually displaying the line connecting the reference points on the surface of the wind turbine blade,
wherein the mounting step comprises adjusting the mounting direction of the vortex generator with reference to the line displayed on the surface of the wind turbine blade and mounting the vortex generator to the wind turbine blade.

4. The method of mounting a vortex generator according to claim 1, wherein each of the pair of marks comprises a plurality of angle-indicating marks.

5. The method of mounting a vortex generator according to claim 1,
comprising aligning a plurality of vortex generators linearly along the line, adjusting the mounting direction of each of the vortex generators with reference to the line, and mounting the plurality of vortex generators to the wind turbine blade.

6. The method of mounting a vortex generator according to claim 5,
wherein the at least two reference points include mounting coordinates of the plurality of vortex generators to be aligned linearly.

7. The method of mounting a vortex generator according to claim 1, further comprising a step of determining a mounting position of the vortex generator on the basis of a fluid-analysis result on the wind turbine blade.

8. The method of mounting a vortex generator according to claim 7,
wherein the step of determining a mounting position of the vortex generator comprises determining mounting positions of a plurality of vortex generators by approximating ideal mounting positions of the plurality of vortex generators indicated by the fluid-analysis result with at least one line.

9. The method of mounting a vortex generator according to claim 1, further comprising a step of measuring the distance in the blade spanwise direction from the blade root or from the blade tip of the wind turbine blade to the measurement point.

10. The method of mounting a vortex generator according to claim 9,
wherein the step of locating the positions of the reference points comprises measuring a plurality of lengths, and locating each of the reference points at (z,l) coordinates on the surface of the wind turbine blade associated with a corresponding length of the plurality of lengths, where:
a measured length of the plurality of lengths is associated with a l-coordinate of a corresponding reference point of the reference points, and
the measured distance corresponds to a z-coordinate of each of the reference points.

11. The method of mounting a vortex generator according to claim 1, further comprising a step of placing a template on the wind turbine blade with reference to the line, the template having at least one opening having a shape corresponding to an outline of the platform portion of the vortex generator,
wherein the step of mounting the vortex generator comprises fitting the platform portion of the vortex generator into the opening of the template placed on the wind turbine blade and mounting the vortex generator to the wind turbine blade.

12. The method of mounting a vortex generator according to claim 11,
wherein the template has a plurality of the openings aligned along a longitudinal direction of the template, and
wherein the vortex generator comprises a plurality of vortex generators and the platform portions of the plurality of vortex generators are fitted into the respective openings of the template to align the plurality of vortex generators linearly along the line.

13. The method of mounting a vortex generator according to claim 11,
wherein a template mark indicating orientation of the vortex generator including the platform portion to be fitted into the opening is formed on the template, and
wherein the step of mounting the vortex generator comprises adjusting the mounting direction of the vortex generator with reference to the template mark of the template, while the platform portion of the vortex generator is fitted in the opening.

14. The method of mounting a vortex generator according to claim 13,
wherein the method comprises adjusting the mounting direction of the vortex generator by revolving the vortex generator while the platform portion of the vortex generator is fitted in the opening.

15. A method of mounting a vortex generator to a wind turbine blade, comprising:
a step of locating portions of at least two reference points at different coordinates in a blade spanwise direction of the wind turbine blade on the wind turbine blade; and
a step of adjusting a mounting direction of the vortex generator and mounting the vortex generator to the wind turbine blade, with reference to a line connecting the reference points,
wherein the step of locating the positions of the reference points comprises locating the position of each of the reference points on the basis of a length along a surface of the wind turbine blade in a chordwise direction from a trailing edge of the wind turbine blade or from a blade spanwise directional line extending along the blade spanwise direction on the surface of the wind turbine blade and a distance in the blade spanwise direction from a blade root or from a blade tip of the wind turbine blade,
the method further comprises a step of placing a template on the wind turbine blade with reference to the line, the template having at least one opening having a shape corresponding to an outline of a platform portion of the vortex generator,
wherein the step of mounting the vortex generator comprises fitting the platform portion of the vortex generator into the opening of the template placed on the wind turbine blade and mounting the vortex generator to the wind turbine blade,
wherein a mark indicating orientation of the vortex generator including the platform portion to be fitted into the opening is formed on the template, and wherein the step of mounting the vortex generator comprises adjusting the mounting direction of the vortex generator with reference to the mark of the template, while the platform portion of the vortex generator is fitted in the opening, wherein the template includes a template body, a rotary part having the opening and mounted rotatably to the template body, and wherein the method comprises adjusting the mounting direction of the vortex generator by revolving the vortex generator together with the rotary part while the platform portion of the vortex generator is fitted in the opening.

\* \* \* \* \*